Patented July 16, 1940

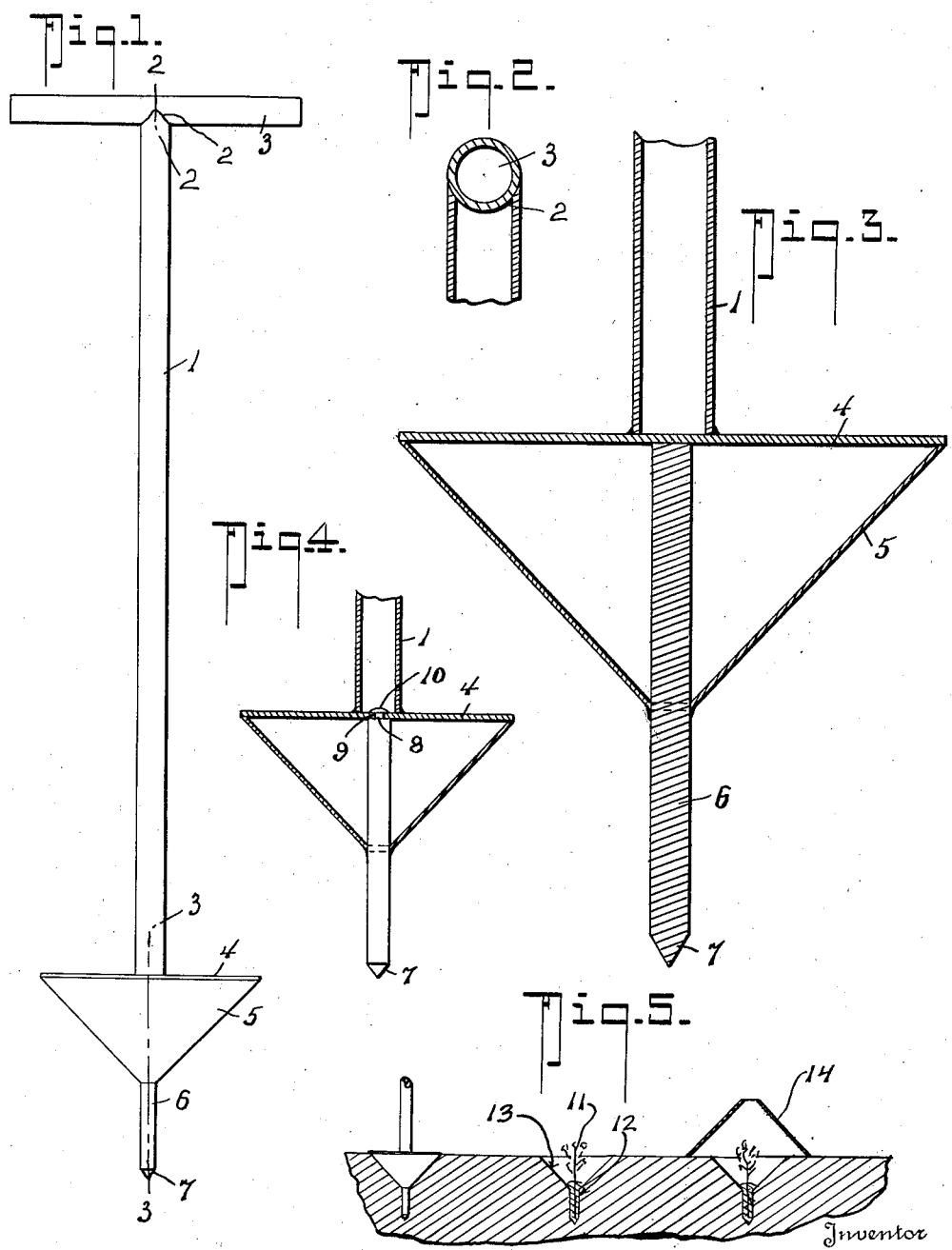

2,207,741

UNITED STATES PATENT OFFICE 2,207,741

PLANT SETTING IMPLEMENT

Murl John Kimble, Billings, Mont.

Application July 6, 1938, Serial No. 217,740

2 Claims. (Cl. 111—99)

My invention relates to implements used in the setting of young plants in the ground, and it particularly has for its object to provide a strong, easily and cheaply manufactured implement which, when pressed to the ground, will provide a conical recess at the bottom of which will be formed a cylindrical pocket for the reception of the roots of the plant and the root-covering earth, thereby leaving around the plant a shallow well or cone-shaped depression in the soil so that when a hot-cap is placed over the plant the cubic air space is increased over that of the cap itself, so that frost-bite and sunburn are greatly reduced; also when the depression is left uncapped it forms a convenient receptacle for water when watering the plants.

Other objects will in part be obvious and in part be pointed out hereinafter.

To the attainment of the aforesaid objects and ends the invention still further resides in the novel details of construction, combination and arrangement of parts, all of which will be first fully described in the following detailed description, and then be particularly pointed out in the appended claims, reference being had to the accompanying drawing, in which:

Fig. 1 is a side elevation of the implement embodying the invention.

Fig. 2 is an enlarged detail vertical section on the line 2—2 of Fig. 1.

Fig. 3 is an enlarged detail vertical section on the line 3—3 of Fig. 1.

Fig. 4 is a view similar to Fig. 3, showing a modification of the invention.

Fig. 5 is a diagrammatic view, illustrating the manner in which the invention is used.

In the drawing, 1 is a pipe, in the upper end of which, in a semicircular recess 2, lies a crosspiece of pipe 3, constituting a handle. The pipes 1 and 3 are permanently secured together, as by welding them together.

At the bottom end of pipe 1 is welded—or otherwise permanently secured—a disc 4, preferably of relatively thick sheet iron, to the periphery of which a cone 5 of thinner material is securely welded, or otherwise permanently secured.

To the bottom or apex end of the cone a pin or rod 6 is secured by welding, or otherwise, the pin 6 preferably having its end sharpened as at 7 to aid penetration, the pin also being sufficiently thick to produce a hole in the ground big enough to receive the roots of the plant, see Fig. 5.

If desired, the pin or rod 6 may be provided with a reduced end 8 passed through a hole 9 in disc 4 and riveted over as at 10, whereby a portion of the down-pressure on rod 6 will be transmitted via disc 4 and cone 5 and another portion will be transmitted directly by disc 4 to rod 6. Further, by passing the pin or rod 6 upwardly to the disc 4 and securing it thereto, either as shown in Fig. 4 or by welding it to the disc if desired, the parts are greatly strengthened and bending of the pin or rod 6 is avoided.

In use, the pin 6 is placed on the ground and the handle 3 is pressed down until cone 5 is sunk to ground level, more or less. A plant 11 (see Fig. 5) is placed in root pocket 12 at the bottom of recess 13 and pocket 12 is filled with soil to embed the roots of the plant.

When a cap 14 is placed over the plant the cubical air space beneath the cap is equal to the contents of the cap 14 plus that of recess 13.

As will be seen from the drawing, the diameter of the base of the cone (plate 4) is considerably greater than the depth of the cone so as to form in the ground a wide recess or pocket in which the plant body is located. This gives ample air space around the plant and also provides the maximum ground area, around the plant, exposed to the sun and heated under the hot cap, and provides for the retention of more heat during the night than can be produced by any other known apparatus or method. By employing my tool and using hot caps, as per Fig. 5, plants may be set out sooner in the spring time than heretofore, and the plants will develop sooner and be ready for the market earlier.

From the foregoing description, taken in connection with the accompanying drawing, it is thought that the construction, advantages and uses of the invention will be apparent to those skilled in the art to which it relates.

What I claim is:

1. In an implement for setting plants below ground level, an elongated member, a hollow cone having a base of greater diameter than the depth of the cone, said elongated member being fixedly secured to the base of the cone, a pin extending into the cone to the base thereof and being secured to the apex of the cone and having a pointed end and lying in line with said elongated member, said cone serving to form a wide deep recess in the ground and the pin serving to form a narrow root pocket at the bottom of the recess, all being arranged so that the roots of a plant will lie in the root pocket while the body of the plant lies within said recess.

2. A plant setting tool comprising a pipe, a disc of relatively great diameter secured at its approximate center permanently to one end of said pipe to lie normal thereto, a sheet metal cone the perimeter of whose base is co-extensive with and rigidly secured to the margin of said disc, a pin passing through said cone at its apex and rigidly and fixedly secured to the apex of the cone and to said disc and having the end of the pin within the cone resting against said disc at the side opposite said pipe, the exposed end of said pin being pointed.

MURL JOHN KIMBLE.